April 15, 1941.  H. A. SMITH  2,238,402
STOVE CONSTRUCTION
Filed Jan. 3, 1938  2 Sheets-Sheet 2
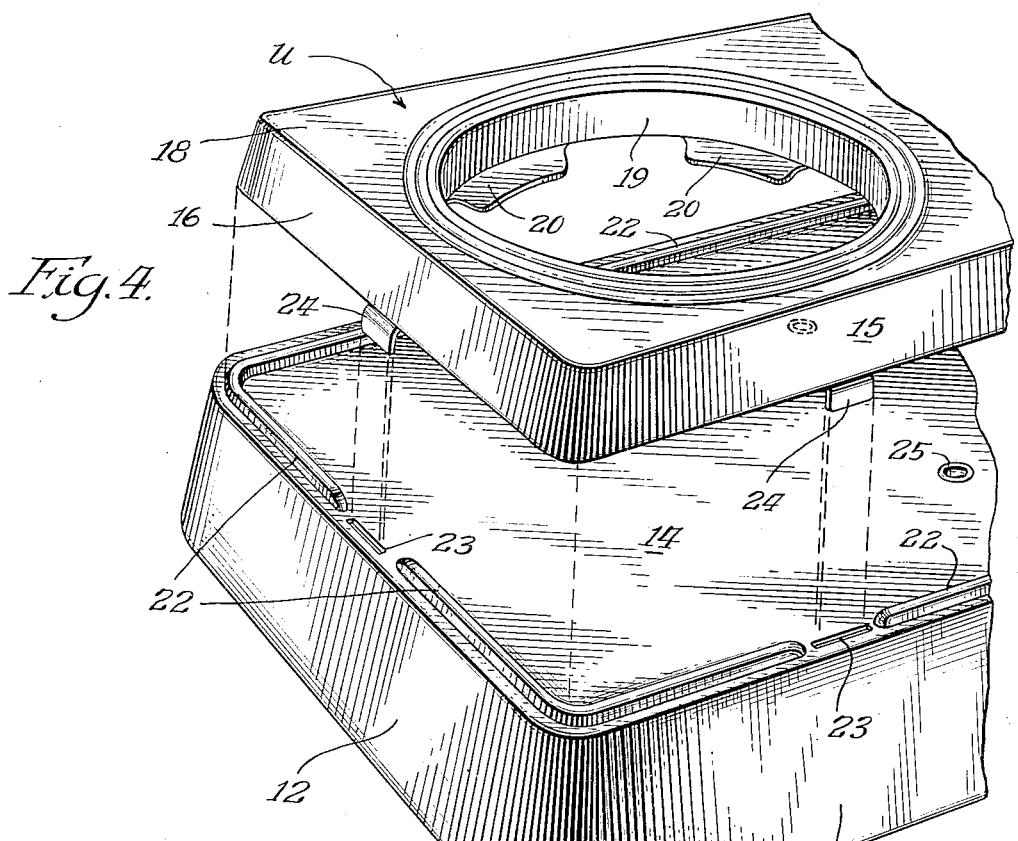
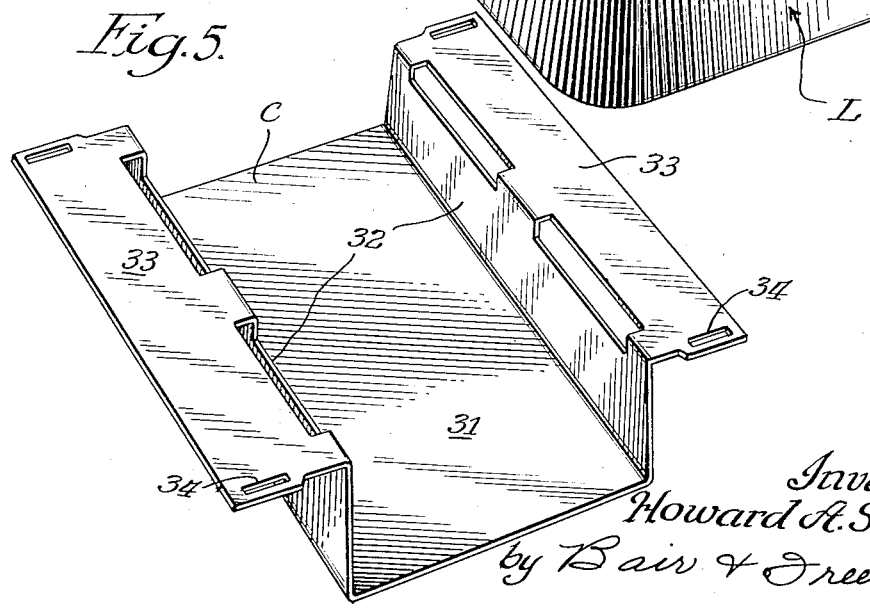
Inventor
Howard A. Smith
by Bair & Freeman
Attys.

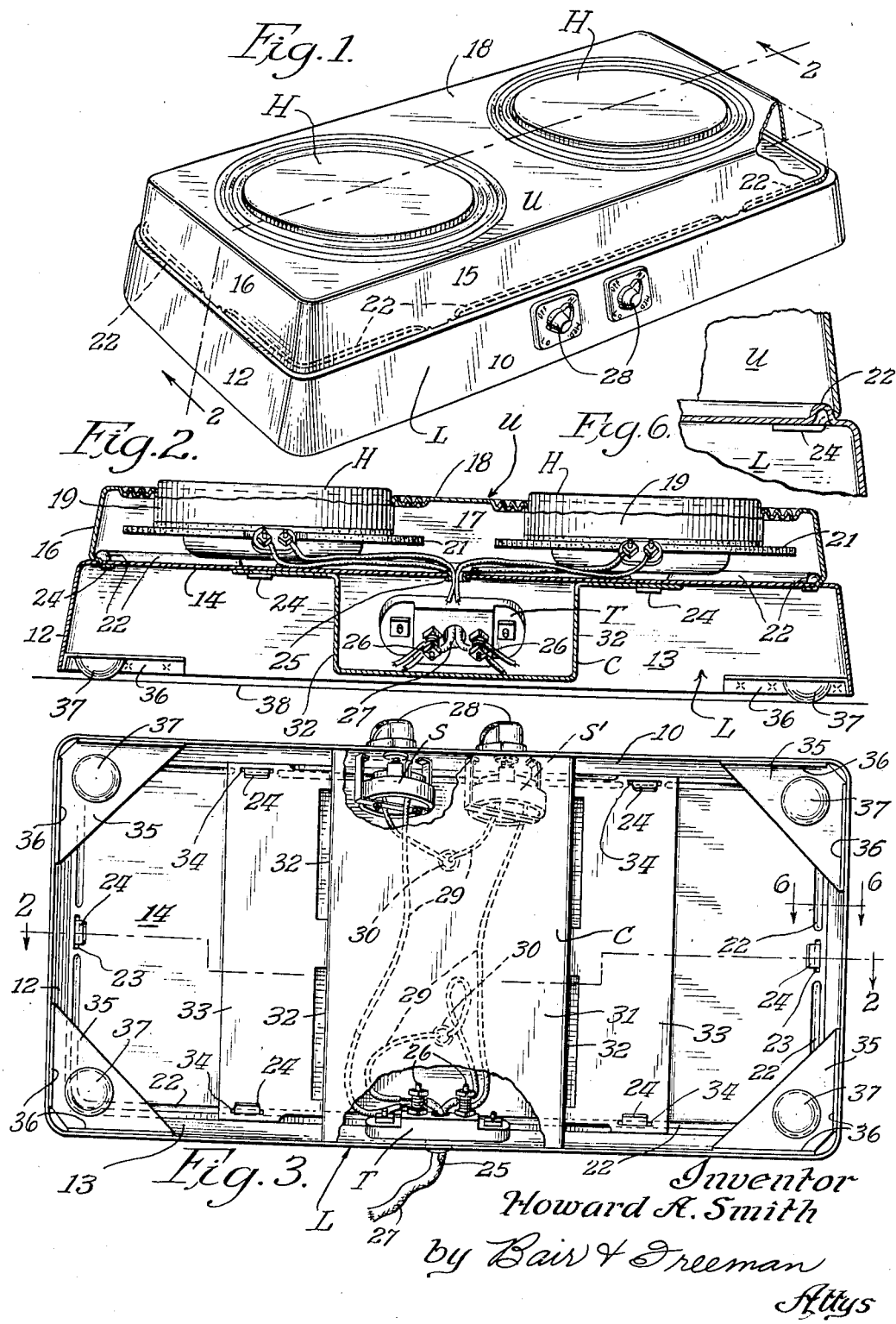

Patented Apr. 15, 1941

2,238,402

UNITED STATES PATENT OFFICE 2,238,402

STOVE CONSTRUCTION

Howard A. Smith, St. Louis, Mo., assignor to Knapp-Monarch Company, St. Louis, Mo., a corporation of Missouri Application January 3, 1938, Serial No. 183,151

2 Claims. (Cl. 219—37)

A further object is to provide a stove including a pair of casings so associated with each other that a double air space is provided between the heating elements and the surface on which the stove is mounted.

Still another object is to provide a lower casing having a peripheral wall and a top and an upper casing of smaller diameter having a peripheral wall and a top and surmounting the lower casing, projections from the lower casing being provided to extend up into the upper casing to center it and interconnecting means being provided which extend downwardly from the upper casing and serve to connect it to the lower casing.

Still a further object is to provide a cover member for the terminal block, switches and wiring within the lower casing, this cover member being also retained in position by the interconnecting means.

With the foregoing objects in view, my invention consists in the disclosed construction, arrangement and combination of the various parts of my stove structure, whereby both the objects contemplated and other apparent objects are attained, as hereinafter set forth, pointed out in my appended claims, and illustrated in the drawings herewith.

In the drawings:

Figure 1 is a perspective view of a stove construction embodying my invention, one corner of the upper casing thereof being broken away.

Figure 2 is a slightly enlarged sectional view on the line 2—2 of Figure 1 showing association of the parts of my stove construction.

Figure 3 is a bottom plan view of the stove with parts of a cover member broken away.

Figure 4 is an enlarged exploded perspective view of the upper and lower casing of the stove prior to assembly.

Figure 5 is a perspective view of the cover member for the switches, terminal block and wiring of the stove; and Figure 6 is an enlarged sectional view on the line 6—6 of Figure 3 showing an interconnecting means for the upper and lower casings.

On the accompanying drawings I have used the reference character L to indicate a lower casing and U an upper casing. The lower casing L has a peripheral wall defined by a front 10, ends 12 and a back 13. The lower casing L also includes a top web 14 which is preferably formed integral with the peripheral wall 10, 12, 13.

The upper casing U includes a peripheral wall having a front 15, ends 16 and a back 17. The upper casing also has a top wall 18, which is provided with one or more depending annular flanges 19. The flanges 19 define openings for heating elements H. The flanges 19 terminate in inwardly directed portions 20 which serve to support the heating elements which may be retained against the portions 20 in any suitable manner. The bottom of each heating element is preferably provided with a disk of insulation 21 to increase the efficiency of the heating element with respect to its heat being directed upwardly to the utensil placed on the stove.

For centering the upper casing U relative to the lower casing L, beads or ribs 22 are provided which contact with the inner surfaces of the peripheral wall 15, 16, 17, as shown particularly in Figure 6. To retain the upper casing U on the lower casing L, the top web 14 of the lower casing is provided with a plurality of slots 23 while the peripheral wall of the upper casing is provided with tongues 24 to extend through the slots and then bend over as shown at the right and left sides of Figures 2 and 3.

A terminal block T is mounted on the wall 13 of the lower casing L. An insulating bushing 25 extends through the wall 13 and a supply cord 27 extends through the bushing and the terminal block T to be connected with terminals 26 thereof (see Figure 3).

At the front of the stove, switches S and S' are provided, each of which has an operating knob 28 located in front of the wall 10 while the switch proper itself is located inside the lower casing. Wiring 29 extends between the supply cord 27, the heating elements H and the switches S and S'. Perforations 30 are provided in the top web 14 of the lower casing through which the wires extend to the heating elements.

A cover member C is provided for the wires 29, the terminal block T and the switches S and S'. The cover member C comprises a bottom wall 31, a pair of side walls 32 and a pair of outwardly directed flanges 33. The flanges 33 are provided with slots 34 to receive certain of the tongues 24 whereby the cover member C is also retained in position by the tongues. Thus a very inexpensive construction which can be economically fabricated is provided.

For supporting the lower casing L, I provide corner plates 35 having flanges 36 which may be spot-welded to the walls 10, 12 and 13. Depressed foot portions 37 are formed in the plates 35 and these, as shown in Figure 2, project to a position where, when they contact with a table top surface 28, will support the lower edge of the peripheral wall of the lower casing spaced above such surface.

My construction permits the fabrication of a very low type of stove with isolation of the heating elements from both the space in the lower casing which is next to the supporting surface and from the switches, wires and terminal block mounted therein. The structure is readily formed of shallow drawn stampings, one of which is smaller than the other so that it can be assembled to surmount the other in such manner as not to give an awkward appearance to the stove. The double casing arrangement permits the desired isolation of the heating elements from the switches, terminal block and wiring without complicating either the construction or the assembly of the stove.

Some departure may be made from the construction and arrangement of the parts as disclosed without, however, departing from the real spirit and purpose of my invention. It is therefore my intention to cover by my claims, any modified forms of structure or use of mechanical equivalents, which may be reasonably included within their scope.

I claim as my invention:

1. In a stove construction, a bottom member having a horizontal top web and a depending flange around the periphery thereof, a top member having a horizontal top portion and a depending flange around the periphery thereof, the lower edge of said last mentioned flange resting on the top web of said bottom member, a plurality of openings in said top web, lugs on said top-member flange extending through said openings to retain said top member in position on said bottom member, upstruck beads in said top web raised above the plane thereof, extending between said openings and engaging the inner surface of said top-member flange, an opening in said top portion of said top member, an annular depending flange surrounding said opening and extending below the plane of said top portion, a plurality of inwardly extending supports on the lower edge of said flange, a heating element supported thereon, a channel shaped member comprising a horizontal web portion, upstanding side flange portions and horizontal wing portions extending outwardly from the upper edges of said side flange portions, openings in said wing portions, said above mentioned lugs extending therethrough, and a wiring compartment formed by the space between the channel shaped member and the top web of said bottom member.

2. In a stove construction, a bottom member having a horizontal top web and a depending flange around the periphery thereof, a top member having a horizontal top portion and a depending flange around the periphery thereof, the lower edge of said last mentioned flange resting on the top web of said bottom member, a plurality of openings in said top web, tongues on said top-member flange extending through said openings to retain said top member in position on said bottom member, upstruck beads in said top web raised above the plane thereof, extending between said openings and engaging the inner surface of said top-member flange, a channel shaped member comprising a horizontal web portion, upstanding side flange portions and horizontal wing portions extending outwardly from the upper edges of said side flange portions, and openings in said wing portions, said above mentioned tongues extending therethrough to retain said channel shaped member in assembled relation to said bottom member.

HOWARD A. SMITH.